US010697559B2

(12) United States Patent
Yoon

(10) Patent No.: US 10,697,559 B2
(45) Date of Patent: Jun. 30, 2020

(54) CONTROL VALVE PNEUMATIC ACTUATOR USING TRANSPARENT CASING AND DOUBLE-RING DIAPHRAGM

(71) Applicant: KEPCO ENGINEERING & CONSTRUCTION COMPANY, INC, Gyeongsangbuk-do (KR)

(72) Inventor: Chang Sun Yoon, Gwangmyeong-shi (KR)

(73) Assignee: KEPCO ENGINEERING & CONSTRUCTION COMPANY, INC., Gyeongsangbuk-Do (KR)

( * ) Notice: Subject to any disclaimer, the term of this patent is extended or adjusted under 35 U.S.C. 154(b) by 3 days.

(21) Appl. No.: 16/248,988

(22) Filed: Jan. 16, 2019

(65) Prior Publication Data
US 2019/0219189 A1 Jul. 18, 2019

(30) Foreign Application Priority Data
Jan. 17, 2018 (KR) ........................ 10-2018-0006267

(51) Int. Cl.
*F16K 31/126* (2006.01)
*F16K 37/00* (2006.01)
*F16K 27/02* (2006.01)

(52) U.S. Cl.
CPC ...... *F16K 31/1262* (2013.01); *F16K 27/0254* (2013.01); *F16K 37/0058* (2013.01)

(58) Field of Classification Search
CPC .. F16K 31/1262; F16K 27/00; F16K 27/0254; F16K 37/0058
See application file for complete search history.

(56) References Cited

U.S. PATENT DOCUMENTS 2,337,841 A * 12/1943 Shafer ................... F16K 31/363
137/553
2,608,211 A * 8/1952 Thorburn ............ F16K 31/1262
137/556.3
(Continued)

FOREIGN PATENT DOCUMENTS

EP 0639737 A1 * 2/1995 ........... F16K 31/124
JP 2006-184194 7/2004
(Continued)

OTHER PUBLICATIONS

Korean Office Action No. 9-5-2018-062992126 dated Nov. 14, 2018.
Korean Notice of Allowance No. 9-5-2018-078223906 dated Nov. 16, 2018.

*Primary Examiner* — Atif H Chaudry
(74) *Attorney, Agent, or Firm* — Nixon Peabody LLP; Jeffrey L. Costellia

(57) ABSTRACT

A control valve pneumatic actuator using a transparent casing includes a casing having a cylindrical shape and made of a transparent material to enable an inside of the casing to be observed from outside, a driveshaft penetrating the inside of the casing, a diaphragm fixedly connected to the driveshaft inside the casing and vertically moving in the casing according to a movement of the driveshaft, a ring holder attached to an outer circumferential of the diaphragm and having a groove having a C-shape, a rubber ring inserted into the groove of the ring holder, a control valve connected to a lower portion of the drive shaft extending below the casing, and a yoke arranged below the casing and connecting the casing to the control valve.

7 Claims, 5 Drawing Sheets

(56) References Cited

U.S. PATENT DOCUMENTS

| | | | | |
|---|---|---|---|---|
| 5,170,693 A | * | 12/1992 | Stary | F15B 15/068 |
| | | | | 251/63.4 |
| 2005/0005966 A1 | * | 1/2005 | Biester | E21B 33/064 |
| | | | | 137/68.13 |
| 2013/0277596 A1 | * | 10/2013 | Alman | F16K 31/1264 |
| | | | | 251/337 |
| 2014/0303793 A1 | * | 10/2014 | Anderson | F16K 31/1262 |
| | | | | 700/282 |
| 2017/0009785 A1 | * | 1/2017 | McEvoy | F15B 15/1433 |

FOREIGN PATENT DOCUMENTS

| | | |
|---|---|---|
| KR | 10-2004-0065902 | 7/2004 |
| KR | 10-1609854 | 3/2016 |

* cited by examiner

CONTROL VALVE PNEUMATIC ACTUATOR USING TRANSPARENT CASING AND DOUBLE-RING DIAPHRAGM

CROSS-REFERENCE TO RELATED APPLICATION

This application claims the benefit of Korean Patent Application No. 10-2018-0006267, filed on Jan. 17, 2018, in the Korean Intellectual Property Office, the disclosure of which is incorporated herein in its entirety by reference.

BACKGROUND

1. Field

One or more embodiments relate to a control valve pneumatic actuator using a transparent casing and a double-ring diaphragm, and more particularly, to a control valve pneumatic actuator using a transparent casing, which is made of a transparent material to allow the inner state of a diaphragm to be checked, and a double-ring diaphragm, which has a double-ring structure to allow grease to be injected between two rubber rings.

2. Description of the Related Art

Pneumatic actuators are usually used to drive a control valve which controls processes in a power plant. There are various types of pneumatic actuators, and diaphragm-type actuators are most commonly used.

Referring to Korean Patent Publication No. 10-1609854, pneumatic actuators according to the related art include a diaphragm casing and a rubber diaphragm. In such pneumatic actuators, a rubber film of the diaphragm may be damaged due to frequent valve operation.

Furthermore, pneumatic actuators according to the related art do not allow the inner state of a diaphragm to be seen during the operation of a power plant, and accordingly, there is no way to check the integrity of the diaphragm. Therefore, normality or abnormality of the diaphragm may not be checked until the diaphragm is destroyed. Abnormality of the diaphragm is confirmed only when the diaphragm is destroyed. In addition, according to the related art, pneumatic actuators are separately manufactured according to a direction at the time of air fail, and a fail position may not be changed on the spot.

Alternatively, piston-type diaphragm actuators are used, but it is hard to replace all types of diaphragms with piston-type diaphragms in industrial sites when cross-section areas available for manufacturing and prices are considered.

SUMMARY

One or more embodiments include a control valve pneumatic actuator using a transparent casing, which is made of a transparent material to allow the inner state of a diaphragm to be checked, and a double-ring diaphragm, which has a double-ring structure to allow grease to be injected between two rubber rings.

Additional aspects will be set forth in part in the description which follows and, in part, will be apparent from the description, or may be learned by practice of the presented embodiments.

According to one or more embodiments, a control valve pneumatic actuator using a transparent casing and a double-ring diaphragm includes a casing having a cylindrical shape and made of a transparent material to enable an inside of the casing to be observed from outside, a driveshaft penetrating the inside of the casing, a diaphragm fixedly connected to the driveshaft inside the casing and vertically moving in the casing according to a movement of the driveshaft, a ring holder attached to an outer circumferential of the diaphragm and having a groove having a C-shape, a rubber ring inserted into the groove of the ring holder, a control valve connected to a lower portion of the drive shaft extending below the casing, and a yoke arranged below the casing and connecting the casing to the control valve.

The ring holder may be arranged in each of two rows, and grooves of respective ring holders in the two rows may form a "3" shape. Two rubber rings may be respectively inserted into the grooves forming the "3" shape and grease may be provided between the two rubber rings.

The control valve pneumatic actuator may further include an injection pipe configured to supply the grease, a connection pipe communicating with the injection pipe and extending in a spiral pattern inside the casing, a branch pipe communicating with the connection pipe and divided into a plurality of parts on the diaphragm, and a nozzle communicating with the branch pipe and arranged between the two rubber rings such that the grease is supplied between the two rubber rings. The branch pipe may include a needle protrusion protruding outward, and the needle protrusion may be caught by an inner wall of the connection pipe.

The control valve pneumatic actuator may further include a spring extension arranged on a top or a bottom of the casing and having a cylindrical shape communicating with the casing; and a spring having an end positioned on a top or a bottom of the diaphragm and an opposite end positioned in the spring extension.

A size of the spring extension may be equal to a size of the yoke. The spring extension may be selectively arranged on the top of the casing or between the casing and the yoke.

The control valve pneumatic actuator may further include a fixing roll arranged on each of top and bottom of the diaphragm to fix the diaphragm to the driveshaft, the fixing roll being put on the driveshaft, wherein the fixing roll may have a fixing screw and the driveshaft may have a fixing recess. The fixing screw may be inserted into the fixing recess.

The control valve pneumatic actuator may further include a nozzle in at least one of the top and the bottom of the casing such that air is injected into the nozzle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
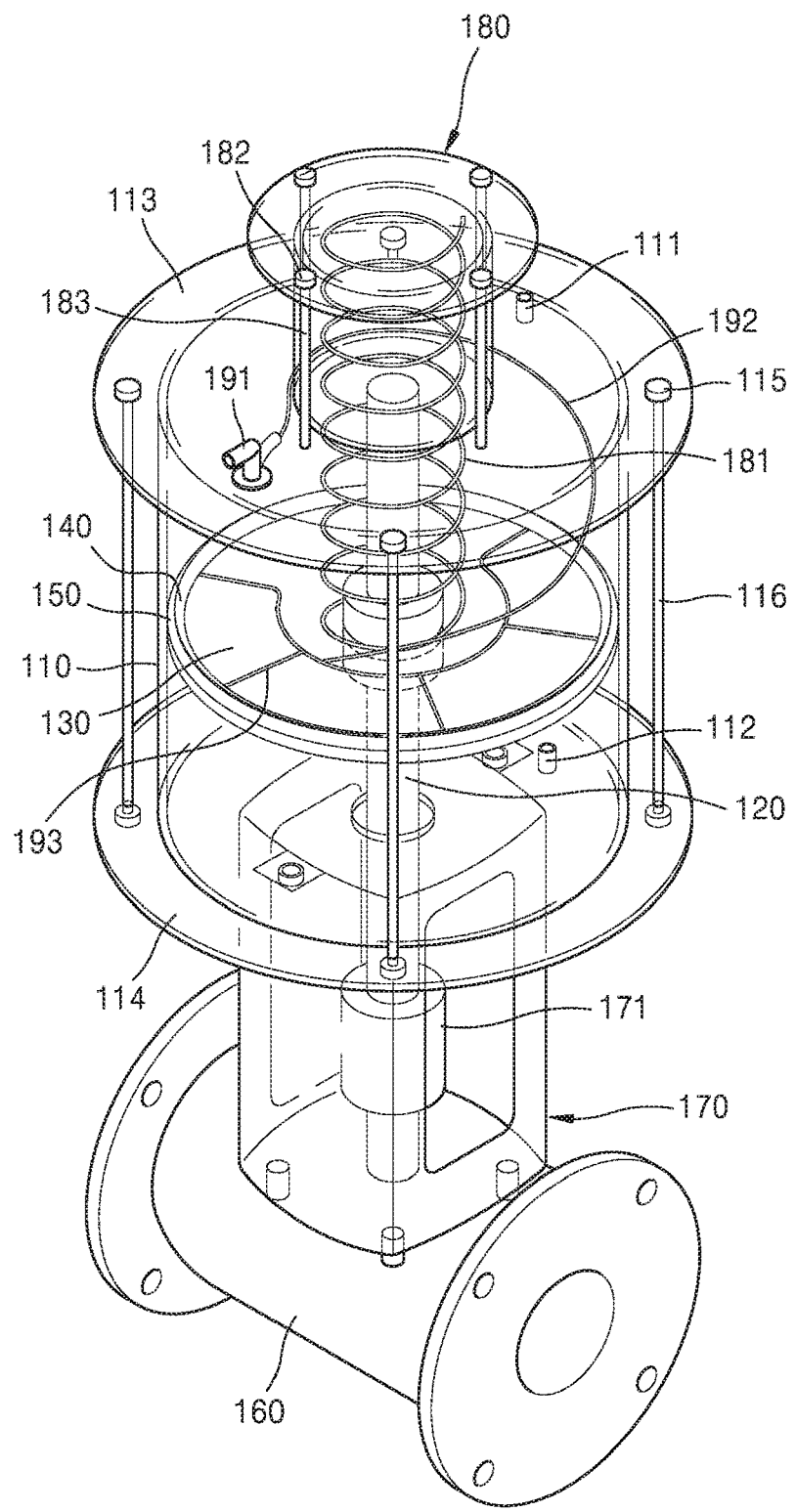
FIG. 1 is a schematic diagram of a control valve pneumatic actuator using a transparent casing and a double-ring diaphragm, according to an embodiment of the present disclosure.

One or more embodiments relate to a control valve pneumatic actuator using a transparent casing and a double-ring diaphragm, and more particularly, to a control valve pneumatic actuator using a transparent casing, which is made of a transparent material to allow the inner state of a diaphragm to be checked, and a double-ring diaphragm, which has a double-ring structure to allow grease to be injected between two rubber rings.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Referring to FIG. 1, a control valve pneumatic actuator using a transparent casing and a double-ring diaphragm includes a casing 110, a driveshaft 120, a diaphragm 130, a ring holder 140, a rubber ring 150, a control valve 160, and a yoke 170.

The casing 110 has a cylinder shape and is empty inside. The diaphragm 130, the driveshaft 120, and the like may be provided inside the casing 110. The casing 110 may be a cylinder of the pneumatic actuator. The casing 110 may be made of a transparent material to enable the inside of the casing 110 to be observed from outside.

Pneumatic actuators according to the related art do not allow the inside of a casing to be observed, and accordingly, normality or abnormality of a diaphragm may not be recognized until the diaphragm is damaged. However, in an embodiment of the present disclosure, the casing 110 is made of a transparent material to allow the inside to be observed from outside so that the inside of the casing 110 may be checked with the naked eye. Accordingly, various faults, such as damage to the diaphragm 130 and the driveshaft 120, corrosion of a spring 181, and the like, occurring inside the casing 110 may be recognized early.

The casing 110 may include a top plate 113 and a bottom plate 114, which have a circular flat shape, in a cylindrical structure. The top plate 113 and the bottom plate 114 may be coupled to each other through a nut 115 and a screw rod 116 having a rod shape with a screw thread, thereby forming a cylinder shape. However, a method of fixing the casing 110 is not limited to the one described above, and various methods may be used if only a cylindrical shape is constructed.

The driveshaft 120 passes through the inside of the casing 110. The driveshaft 120 may vertically move in the casing 110. The control valve 160, which is connected to a lower portion of the driveshaft 120, may be controlled through the vertical movement of the driveshaft 120.

The diaphragm 130 is fixedly connected to the driveshaft 120 inside the casing 110 and vertically moves in the casing 110 according to the movement of the driveshaft 120. Since the diaphragm 130 is fixedly connected to the driveshaft 120, the diaphragm 130 may move with the driveshaft 120 when the driveshaft 120 moves vertically.

The diaphragm 130 has a circular plate shape. The diameter of the diaphragm 130 may be a little smaller than the inner diameter than the casing 110. The diaphragm 130 may divide the internal space of the casing 110 into two spaces. When the rubber ring 150 is fitted around the diaphragm 130, the rubber ring 150 is in contact with an inner circumferential surface of the casing 110, and accordingly, the two spaces of the casing 110 may be airtightly isolated from each other.

Since the outer circumferential surface of the diaphragm 130 is fitted into the rubber ring 150 via the ring holder 140, the diameter of the diaphragm 130 may be a little smaller than the inner diameter of the casing 110. The diameter of an assemblage of the diaphragm 130 and the rubber ring 150, which is obtained when the rubber ring 150 is fitted around the diaphragm 130, may be a little greater than the inner diameter of the casing 110.

When the casing 110 is divided into two spaces by the diaphragm 130 and the rubber ring 150, the driveshaft 120 and the diaphragm 130 may be vertically moved by injecting air into each of the two spaces. In detail, an upper or a lower nozzle 111 or 112 through which air may be injected may be provided in at least one of upper and lower portions of the casing 110.

In the case of double acting type, the upper nozzle 111 and the lower nozzle 112 may be provided in an upper surface and a lower surface, respectively, of the casing 110. In the case of single acting type, the spring 181 may be used and only one of the upper nozzle 111 and the lower nozzle 112 may be provided. When air is injected through either the upper nozzle 111 or the lower nozzle 112, a pressure difference between the two spaces of the casing 110 occurs, and the diaphragm 130 and the driveshaft 120 may vertically move due to the pressure difference. As the driveshaft 120 vertically moves, the control valve 160 provided below the driveshaft 120 may be controlled.

Figure 2:
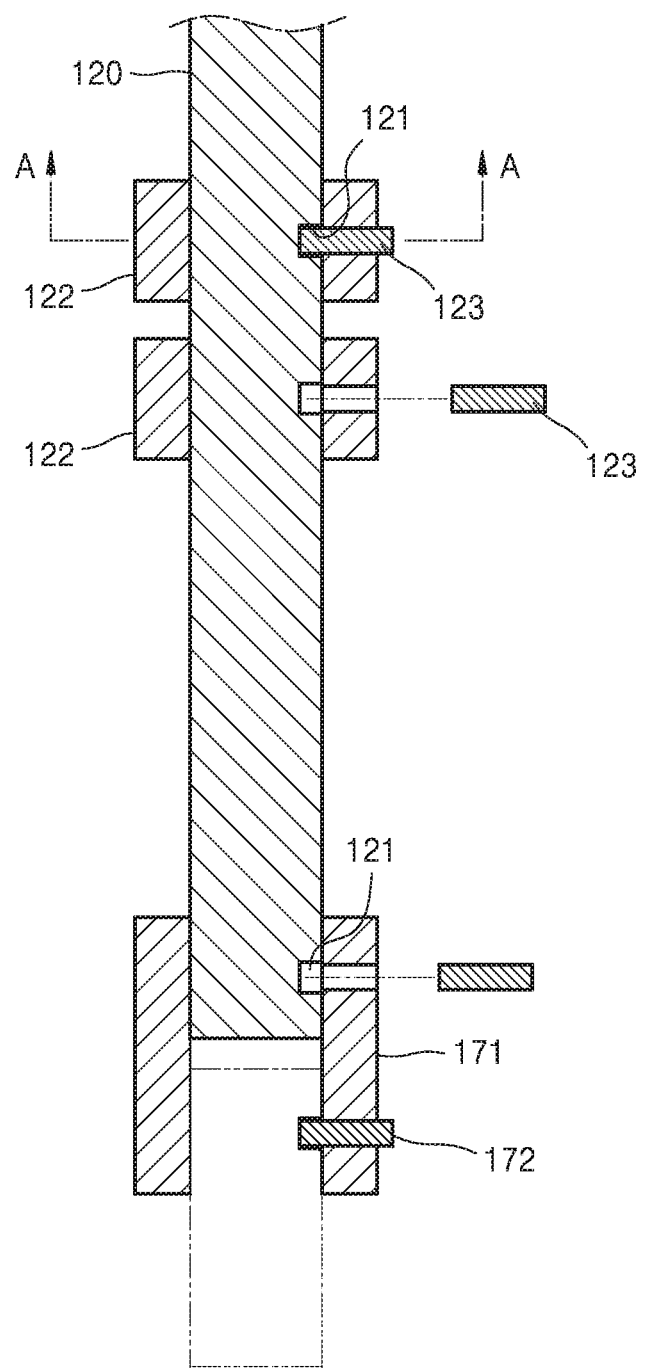
FIG. 2 is a diagram showing a driveshaft and a fixing roll, according to an embodiment of the present disclosure.
Figure 3:
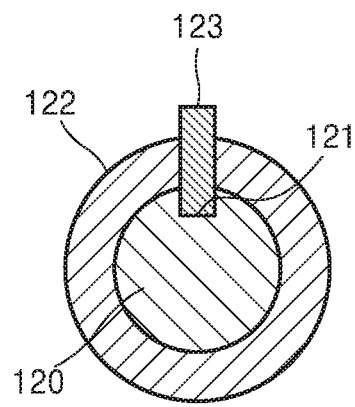
FIG. 3 is a diagram showing a cross-section taken along line A-A in FIG. 2.

To enable the driveshaft 120 and the diaphragm 130 to move together, the diaphragm 130 needs to be fixedly connected to the driveshaft 120. Referring to FIGS. 2 and 3, a fixing roll 122 may be used to fixedly connect the diaphragm 130 to the driveshaft 120.

The fixing roll 122 has a circular plate shape and has a hole in the middle such that the fixing roll 122 may be put on the driveshaft 120. Fixing rolls 122 may be put on the driveshaft 120 such that the fixing rolls 122 are respectively on the top and the bottom of the diaphragm 130. The diaphragm 130 may be fixed to the driveshaft 120 by using the fixing rolls 122.

In detail, to fix the diaphragm 130 to the driveshaft 120 through each of the fixing rolls 122, a fixing screw 123 is provided in each fixing roll 122 and a fixing recess 121 is provided in the driveshaft 120. The fixing screw 123 may be inserted into the fixing recess 121. Referring to FIG. 3, the fixing roll 122 is put on the driveshaft 120, and the position of the fixing roll 122 is adjusted such that the fixing screw 123 may be inserted into the fixing recess 121. When the fixing screw 123 is tightened, the fixing screw 123 is inserted into the fixing recess 121, and accordingly, the fixing roll 122 is fastened to the driveshaft 120.

The fixing rolls 122 are provided respectively on the top and the bottom of the diaphragm 130. When the fixing rolls 122 are fastened to the driveshaft 120 to be respectively on the top and the bottom of the diaphragm 130, the diaphragm 130 may be fixedly connected to the driveshaft 120 by the fixing rolls 122. This connecting method may also be used when a connector 171 provided in the yoke 170, which will be described below, is coupled to the driveshaft 120.

Figure 4:
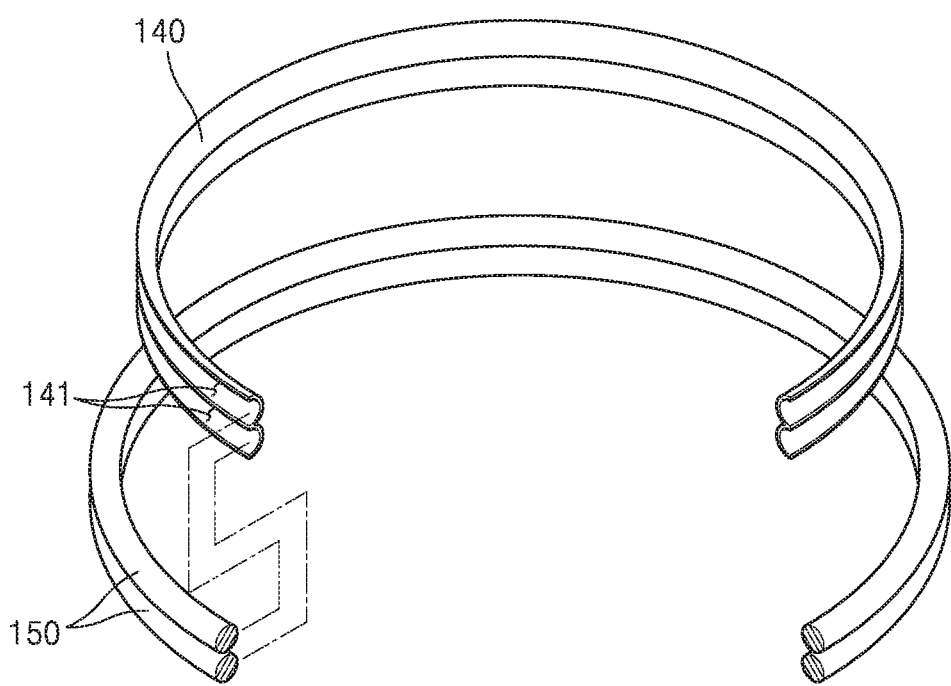
FIG. 4 is a diagram showing a double-ring holder and a rubber ring, according to an embodiment of the present disclosure.

Referring to FIG. 4, to divide the casing 110 into two spaces using the diaphragm 130 and the rubber ring 150, the rubber ring 150 needs to be fitted to the diaphragm 130. The ring holder 140 is used to fit the rubber ring 150 to the diaphragm 130.

The ring holder 140 is attached to the outer circumferential surface of the diaphragm 130 and includes a groove 141 having a C-shape. The ring holder 140 may be manufactured using a metal. The ring holder 140 may be put around the circumference (i.e., the outer circumferential surface) of the diaphragm 130 and then attached to the diaphragm 130 using spot welding.

The ring holder 140 may be coupled to the diaphragm 130 in double-ring shape. In other words, two ring holders 140 may be coupled to each other side by side. When the two ring holders 140 are coupled to each other side by side, two grooves 141 having a C-shape are connected to each other, thereby forming a "3" shape.

As such, when the grooves 141 form a "3" shape by respectively arranging the two ring holders 140 in two rows, two rubber rings 150 may be respectively inserted into the grooves 141. Each of the rubber rings 150 is inserted into either one of the grooves 141. The rubber rings 150 are respectively inserted into the grooves 141 of the respective ring holders 140, which are arranged in two rows and form a "3" shape.

When the rubber rings 150 are respectively inserted into the grooves 141, a slight space may be created between the rubber rings 150. Since each of the rubber rings 150 has a circular cross-section, a valley (i.e., the slight space) may be created between two circular cross-sections that meet each other. Grease 190 may be provided in the slight space between the rubber rings 150.

The diaphragm 130 and each rubber ring 150 divide the casing 110 into two spaces. When air is injected into either of the two spaces, the diaphragm 130 moves vertically. Accordingly, the two spaces of the casing 110 need to be airtight from each other to enable the diaphragm 130 to move. To meet this necessity, the rubber ring 150 coupled to the diaphragm 130 needs to be in airtight contact with the inner circumferential surface of the casing 110.

However, frictional resistance may occur between the rubber ring 150 and the inner circumferential surface of the casing 110 when the diaphragm 130 moves vertically. The frictional resistance between the rubber ring 150 and the inner circumferential surface of the casing 110 may hinder the vertical movement of the diaphragm 130 and also cause damage to the rubber ring 150.

To reduce the frictional resistance, grease may be provided on the inner circumferential surface of the casing 110. However, the grease may be exhausted when the diaphragm 130 performs a reciprocating motion for a long time, and it is difficult to supply grease during the operation of a power plant.

In an embodiment, two rubber rings 150 are provided and the grease 190 is provided between the rubber rings 150. The grease 190 stored in the slight space between the rubber rings 150 is continuously supplied such that airtightness may be maintained even when the diaphragm 130 performs a reciprocating motion for a long time.

An injection pipe 191, a connection pipe 192, a branch pipe 193, and a nozzle 194 may be further provided to supply the grease 190 between the rubber rings 150.

Figure 5:
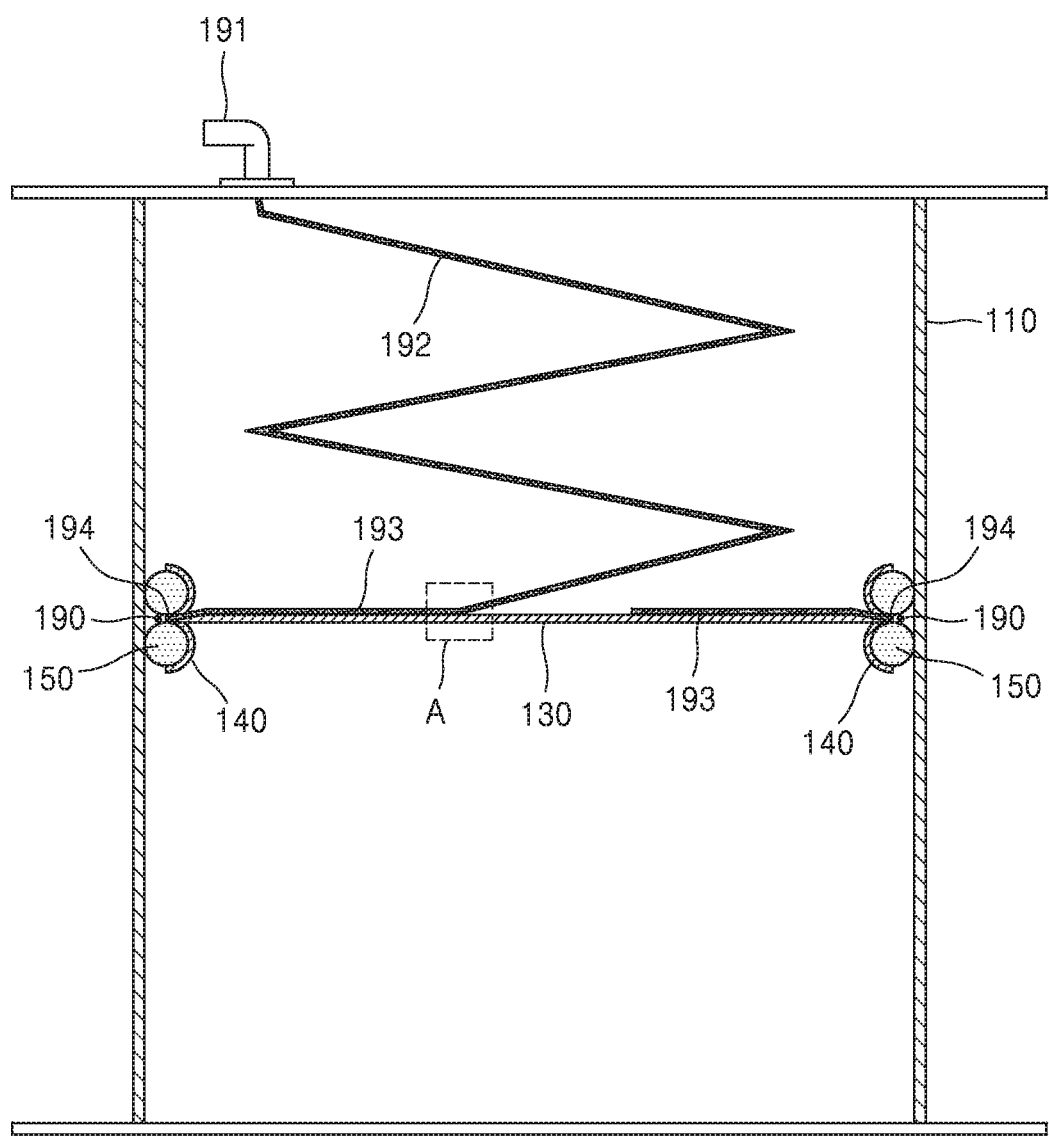
FIG. 5 is an internal cross-sectional view of a casing according to an embodiment of the present disclosure.

Referring to FIGS. 1 and 5, the injection pipe 191 may be provided outside the casing 110 to allow the grease 190 to be supplied. The injection pipe 191 may be compatible with common grease guns. Grease may be injected into the injection pipe 191 with at least a certain pressure.

The connection pipe 192 communicates with the injection pipe 191. The connection pipe 192 may extend in a vortex pattern inside the casing 110. In detail, the connection pipe 192 may be implemented as a flexible tube including a transparent material and may extend to the diaphragm 130 while rotating around the driveshaft 120 in a vortex pattern in the casing 110. The connection pipe 192 may have a sufficient length in a vortex pattern not to be subjected to a load when the diaphragm 130 is at either a highest point or a lowest point in a drivable range.

The branch pipe 193 communicates with the connection pipe 192 and is divided into a plurality of parts. The connection pipe 192 extends to the diaphragm 130 and branches off to a plurality of parts on the diaphragm 130 to form the branch pipe 193. The branch pipe 193 may be arranged on the diaphragm 130. The branch pipe 193 is divided into a plurality of parts toward the inner circumferential surface of the diaphragm 130.

Figure 6:
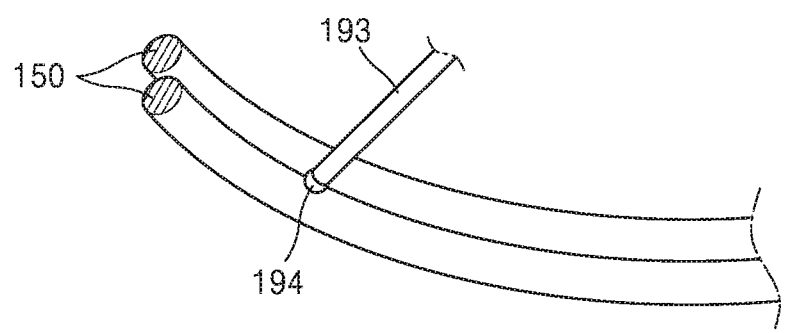
FIG. 6 is a diagram showing two rubber rings and a nozzle, according to an embodiment of the present disclosure.

The nozzle 194 communicates with the branch pipe 193 and allows the grease 190 to be supplied between the rubber rings 150. In detail, referring to FIG. 6, the nozzle 194 is positioned in the slight space between the rubber rings 150. The grease 190 is supplied between the rubber rings 150 through the nozzle 194.

The grease 190 may be continuously supplied between the rubber rings 150 through the injection pipe 191, the connection pipe 192, the branch pipe 193, and the nozzle 194, and therefore, airtightness may be maintained even when the diaphragm 130 performs a reciprocating motion for a long time and the grease 190 may be continuously supplied even during the operation of a power plant.

Figure 7:
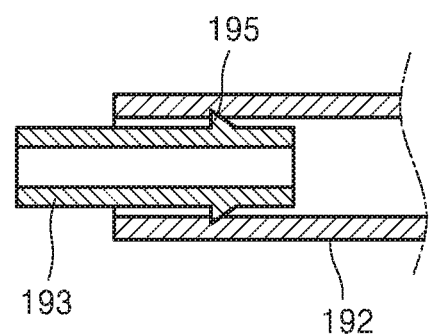
FIG. 7 is an enlarged view of a region A in FIG. 5.

Referring to FIG. 7, a needle protrusion 195 protruding outward may be provided on the branch pipe 193 and may be caught on an inner wall of the connection pipe 192. The branch pipe 193 may be inserted into and coupled to the connection pipe 192. At this time, the needle protrusion 195 prevents the branch pipe 193 from being decoupled from the connection pipe 192 due to a pressure.

As shown in FIG. 7, the needle protrusion 195 of the branch pipe 193 has a diagonal line tapering in a direction in which the branch pipe 193 is inserted into the connection pipe 192. Due to this shape of the needle protrusion 195, the branch pipe 193 may be easily inserted into the connection pipe 192 and may be prevented from falling out of the connection pipe 192 since the needle protrusion 195 is caught on the inner wall of the connection pipe 192.

The control valve 160 is connected to the lower portion of the driveshaft 120. The driveshaft 120 penetrates the bottom of the casing 110 and extends below the casing 110. The lower portion of the driveshaft 120 is connected to the control valve 160. The control valve 160 may be controlled via the vertical movement of the driveshaft 120. The control valve 160 may be implemented using a control valve according to the related art, and detailed descriptions thereof will be omitted since it is well known.

The yoke 170 is provided below the casing 110 and connects the casing 110 to the control valve 160. The connector 171, which may connect separate two portions of the driveshaft 120, may be provided in the yoke 170. The yoke 170 may be compatible with control valves according to the related art and used to connect a control valve to an actuator. Since the yoke 170 is well known, detailed descriptions thereof will be omitted.

The connector 171 provided in the yoke 170 may connect two portions of the driveshaft 120. The connector 171 has a hole at the center thereof such that the two portions of the driveshaft 120 may be inserted into the hole. Referring to FIG. 2, a connector screw 172 is provided in the connector 171, and the fixing recess 121, into which the connector screw 172 may be inserted, is provided in each of the two portions of the driveshaft 120. After the connector 171 is put on the two portions of the driveshaft 120, the position of the connector 171 is adjusted to allow the connector screw 172 to be inserted into the fixing recess 121 in each of the two portions of the driveshaft 120. When the connector screw 172 is tightened, the connector screw 172 is inserted into the fixing recess 121, and accordingly, the connector 171 is simultaneously coupled to the two portions of the driveshaft 120, thereby connecting the two portions of the driveshaft 120 to each other.

A method of operating a control valve pneumatic actuator using a transparent casing and a double-ring diaphragm, according to an embodiment, will be described below.

In an embodiment, the diaphragm 130 is connected to the driveshaft 120 in the casing 110, which is made of a transparent material and has a cylindrical shape, such that the driveshaft 120 may move similarly to a cylinder, and the driveshaft 120 that moves is connected to the control valve 160 such that the control valve 160 may be controlled.

The control valve pneumatic actuator using a transparent casing and a double-ring diaphragm may operate as either a double acting type, in which both the upper nozzle 111 and the lower nozzle 112 are provided in the casing 110, or a single acting type, in which at least one of the upper and lower nozzles 111 and 112 is provided in the casing 110 and the spring 181 is also used.

When the control valve pneumatic actuator operates as a double acting type, both of the upper and lower nozzles 111 and 112 are used, and the control valve pneumatic actuator is operable without the spring 181. In detail, the diaphragm 130 and the driveshaft 120 may move downward when air is injected through the upper nozzle 111 and upward when air is injected through the lower nozzle 112, thereby controlling the control valve 160.

When the control valve pneumatic actuator operates as a single acting type, it may further include a spring extension 180 and the spring 181. The spring extension 180 is provided on a top or a bottom of the casing 110 and has a cylindrical shape communicating with the casing 110. An end of the spring 181 is positioned on a top or a bottom of the diaphragm 130 and an opposite end of the spring 181 is positioned in the spring extension 180.

The spring extension 180 is a space provided for use of the spring 181. When the spring 181 is positioned on the top of the diaphragm 130, as shown in FIG. 1, the spring extension 180 may be provided on the top of the casing 110. When the spring 181 is positioned on the bottom of the diaphragm 130, the spring extension 180 may be provided on the bottom of the casing 110 such that the spring extension 180 is positioned between the casing 110 and the yoke 170. Here, the spring extension 180 may be made of a transparent material such that the inside of the spring extension 180 may be observed.

When the spring extension 180 and the spring 181 are provided, the control valve pneumatic actuator is operable even if only one of the upper and lower nozzles 111 and 112 is provided. In detail, when the spring extension 180 is provided on the top of the casing 110 and the spring 181 is positioned on the top of the diaphragm 130, air is injected through the lower nozzle 112. The diaphragm 130 and the driveshaft 120 move upward when the air is injected through the lower nozzle 112 and move downward due to the spring 181 when the air is expelled through the lower nozzle 112, thereby controlling the control valve 160.

In the same manner, when the spring extension 180 is provided on the bottom of the casing 110 and the spring 181 is positioned on the bottom of the diaphragm 130, air is injected through the upper nozzle 111. The diaphragm 130 and the driveshaft 120 move downward when the air is injected through the upper nozzle 111 and move upward due to the spring 181 when the air is expelled through the upper nozzle 111, thereby controlling the control valve 160.

At this time, the spring extension 180 may have the same size as the yoke 170. When the spring extension 180 has the same size as the yoke 170, the spring extension 180 may be selectively coupled either to the top of the casing 110 or between the casing 110 and the yoke 170. The spring extension 180 may be assembled using a bolt 182 and a screw axis 183. The spring extension 180 may be assembled using other various methods apart from using the bolt 182 and the screw axis 183.

As such, when the spring extension 180 is selectively coupled either to the top of the casing 110 or between the casing 110 and the yoke 170, the spring 181 may be freely arranged, suitable for a fail position of a process (or a final position at the time of air fail), and the arrangement of the spring 181 may be changed on the spot according to the fail position.

In detail, assembly may be performed in order of the spring extension 180, the casing 110, and the yoke 170, and this assembly order may be changed into an order of the casing 110, the spring extension 180, and the yoke 170 on the spot when necessary.

A positioner is a device that is connected to the upper nozzle 111 or the lower nozzle 112 to receive a current of about 4 mA to about 20 mA and control the injection of air. When the assembly is performed in order of the spring extension 180, the casing 110, and the yoke 170, the positioner may be connected to the lower nozzle 112 for air injection. When the assembly is performed in order of the casing 110, the spring extension 180, and the yoke 170, the positioner may be connected to the upper nozzle 111 for air injection. Since the position of the spring extension 180 may also be changed in the case of single acting type, both the upper nozzle 111 and the lower nozzle 112 may be provided.

According to one or more embodiments, a control valve pneumatic actuator using a transparent casing and a double-ring diaphragm has the effects described below.

According to the related art, a pneumatic actuator does not allow the inner state of a diaphragm to be seen during the operation of a power plant, and accordingly, there is no way to check the integrity of the diaphragm. However, in one or more embodiments, the casing 110 is made of a transparent material such that the inside of the casing 110 may be checked with the naked eye, and accordingly, corrosion of the spring 181 and faults in other elements inside the casing 110 may be recognized early.

According to the related art, a diaphragm including a rubber material is damaged by frictional resistance. However, in one or more embodiments, the ring holders 140 having the grooves 141 forming a "3" shape are attached to the outer circumferential surface of the diaphragm 130 and two rubber rings 150 are used. The grease 190 is continuously supplied between the rubber rings 150, and accordingly, damage to the diaphragm 130 may be prevented. In particular, efficient airtightness is realized through a double-ring fixing structure using two rubber rings 150, and accordingly, reliable control is possible. Unlike the related art, a control valve pneumatic actuator according to one or more embodiments does not include a structure which may be torn like a rubber diaphragm and may be semipermanently used if the rubber rings 150 coupled to the outer circumferential surface of the diaphragm 130 are replaced.

In addition, the grease 190 may be continuously supplied through the injection pipe 191, the connection pipe 192, the branch pipe 193, and the nozzle 194 and may be injected even during the operation of a plant, and therefore, maintainability is improved.

In one or more embodiments, the spring extension 180 has the same size as the yoke 170 and may thus be selectively arranged on the top of the casing 110 or between the casing 110 and the yoke 170. Accordingly, when there is a change in a fail position on the spot or due to a change in design, the fail position may be easily changed by changing the place of the spring extension 180 in an assembly order.

In addition, as compared to existing piston-type actuators, a control valve pneumatic actuator according to one or more embodiments may be economical since the control valve pneumatic actuator may be manufactured using cheap materials and has a simple structure.

As described above, according to one or more embodiments, since a casing is made of a transparent material, the inside of the casing may be checked with the naked eye, and accordingly, faults occurring in the casing may be recognized early.

In addition, since a double-ring structure is attached to a diaphragm and grease is injected between two rubber rings, efficient airtightness may be realized, and accordingly, reliable control may be possible.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A control valve pneumatic actuator using a transparent casing and a double-ring diaphragm, the control valve pneumatic actuator comprising:
    a casing having a cylindrical shape and made of a transparent material to enable an inside of the casing to be observed from outside;
    a driveshaft penetrating the inside of the casing;
    a diaphragm fixedly connected to the driveshaft inside the casing and vertically moving in the casing according to a movement of the driveshaft;
    a ring holder attached to an outer circumferential of the diaphragm and having a groove having a C-shape;
    a rubber ring inserted into the groove of the ring holder;
    a control valve connected to a lower portion of the drive shaft extending below the casing;
    a yoke arranged below the casing and connecting the casing to the control valve,
    an injection pipe configured to supply the grease;
    a connection pipe communicating with the injection pipe and extending in a spiral pattern inside the casing;
    a branch pipe communicating with the connection pipe and divided into a plurality of parts on the diaphragm; and
    a nozzle communicating with the branch pipe and arranged between the two rubber rings such that the grease is supplied between the two rubber rings,
    wherein the ring holder is arranged in each of two rows, and grooves of respective ring holders in the two rows form a "3" shape, two rubber rings are respectively inserted into the grooves forming the "3" shape, and grease is provided between the two rubber rings, and grease is provided between the two rubber rings.

2. The control valve pneumatic actuator of claim 1, wherein the branch pipe comprises a needle protrusion protruding outward, and the needle protrusion is caught by an inner wall of the connection pipe.

3. The control valve pneumatic actuator of claim 1, further comprising:
    a spring extension arranged on one of a top and a bottom of the casing and having a cylindrical shape communicating with the casing; and
    a spring having an end positioned on one of a top and a bottom of the diaphragm and an opposite end positioned in the spring extension.

4. The control valve pneumatic actuator of claim 3, wherein a size of the spring extension is equal to a size of the yoke.

5. The control valve pneumatic actuator of claim 4, wherein the spring extension is selectively arranged on the top of the casing or between the casing and the yoke.

6. The control valve pneumatic actuator of claim 1, further comprising a fixing roll arranged on each of top and bottom of the diaphragm to fix the diaphragm to the driveshaft, the fixing roll being put on the driveshaft,
    wherein the fixing roll has a fixing screw and the driveshaft has a fixing recess, wherein the fixing screw is inserted into the fixing recess.

7. The control valve pneumatic actuator of claim 1, further comprising a nozzle in at least one of a top and a bottom of the casing such that air is injected into the nozzle.

* * * * *